INVENTORS
HARRY T. JOHNSON
PHILIP L. TURNER
BY John R. Faulkner
Glenn S. Arendsen
ATTORNEYS United States Patent Office 3,560,601
Patented Feb. 2, 1971

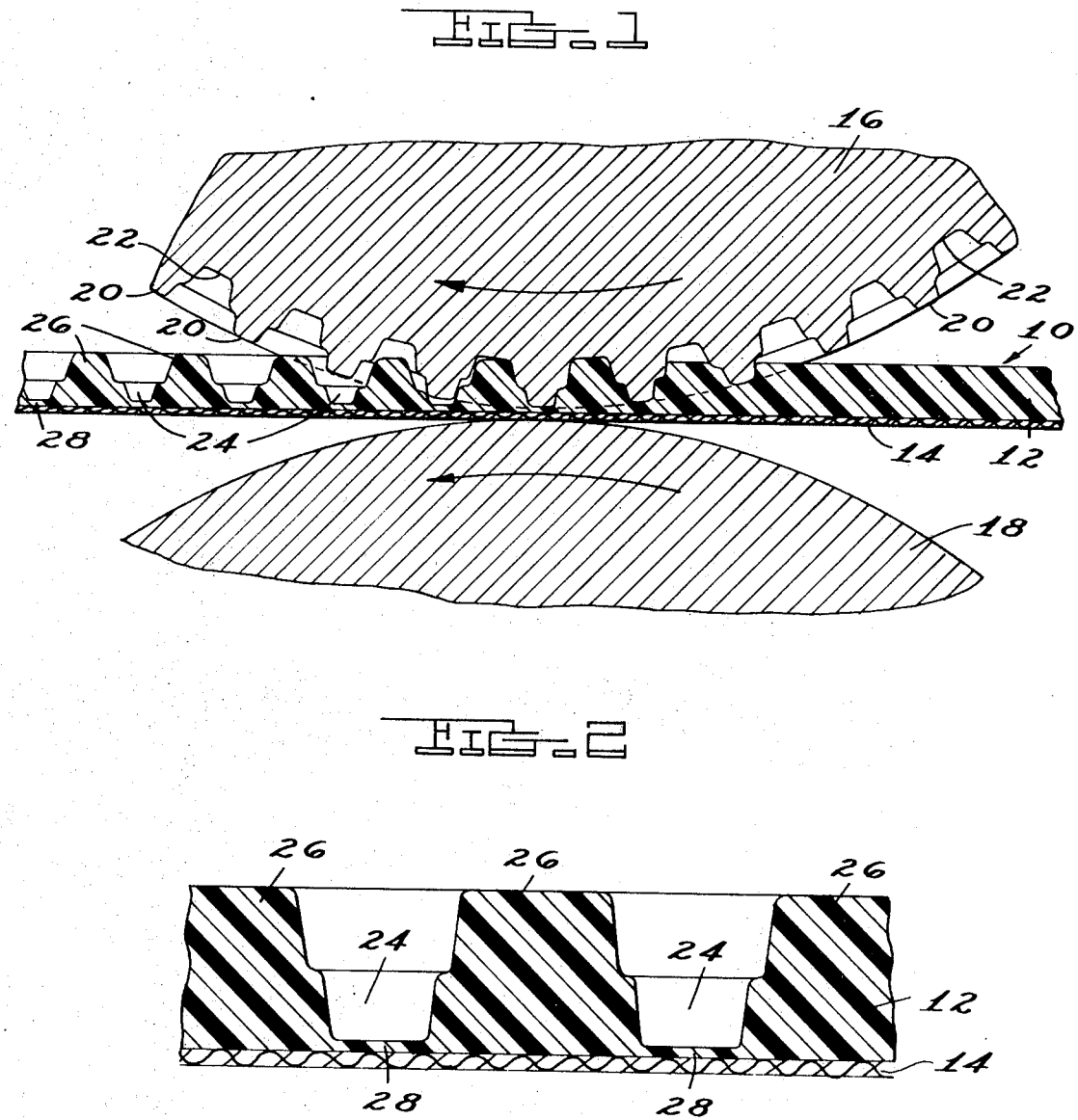

3,560,601
PROCESS FOR MANUFACTURING POROUS
THERMOPLASTIC SHEET MATERIAL
Harry T. Johnson, Dearborn, and Philip L. Turner, Southfield, Mich., assignors to Ford Motor Company, Dearborn, Mich., a corporation of Delaware
Filed Nov. 25, 1968, Ser. No. 778,435
Int. Cl. B29c 17/00, 17/08, 24/00
U.S. Cl. 264—93
7 Claims

ABSTRACT OF THE DISCLOSURE

Fabric backed polyvinyl chloride sheet material is passed over an embossing roll containing the desired surface pattern and a plurality of small studs that produce depressions extending through about 80–95% of the polyvinyl chloride film thickness. Heated air then is directed against the sheet material. The heat and pressure of the air combine to remove the thin sections remaining at the bottoms of the depressions and smooth the edges of the resulting perforations.

SUMMARY OF THE INVENTION

Breathable sheet materials are being manufactured at increasing rates for automobile upholstery and interior trim. Typical of such materials are the knitted vinyls described in U.S. patent application Burnett et al. Ser. No. 717,554, filed Apr. 1, 1968, now Pat. No. 3,491,560 used widely for upholstering automobile seats. The knitted vinyls also have achieved some usage in upholstering household furnishings. Embossed and mechanically perforated sheet materials are used for automobile interior trim items such as the headliner and door panel coverings.

Such knitted vinyls have an excellent combination of tensile and tear strength properties along with good aesthetic appearance and feel. The perforated materials on the other hand suffer from low strength properties primarily because tears tend to develop at the perforations, poor appearance because of material deformation during the perforating operations, and poor porosity control because the elasticity of the material tends to close the perforations. A backing fabric of course is capable of improving the strength properties but the perforating operations usually damage the backing fabric so severely that most of the expected strength improvement was lost.

This invention provides a process for perforating sheets of thermoplastic polymeric material to produce sheets having good strength and appearance and uniform predictable porosity. Sheets strengthened by a backing fabric can be perforated by the process without damaging the backing fabric. The initial step of the process is to form mechanically in the sheet material a plurality of depressions approximately equalling the size of the desired perforations. Instead of extending through the entire thickness of the sheet material, the depressions leave a thin section of material at the bottom surface. Heat and a fluid pressure differential then are applied to the material. The heat raises the temperature of the thin sections faster than the other portions of the material, and the fluid pressure then opens the thin sections to complete the perforations.

Using heated air as the fluid combines the heating and pressurizing steps. The heated air is directed against the material from an elongated nozzle extending across the material width. As the thin sections melt, heated air begins rushing through the perforations to melt the remaining portions of the thin sections in a progressive manner that terminates when the material of the thin section has blended with the material surrounding the perforation.

Heated air having a temperature considerably higher than the melting temperature of the material can be used where the material moves rapidly across the nozzle. Air temperatures at least 100 Fahrenheit degrees above the melting point provide a reasonably rapid production, and temperatures of over 300 degrees above the melting point are preferred. Cooling shoes can be provided on both sides of the nozzle to assist in keeping the temperature of the main body of the material below the melting point.

The depressions are formed conveniently by passing the material between two steel rolls, one of which has a plurality of projecting studs thereon. For best appearance the depressions are formed in the intended outer surface, and an embossing pattern can be included on the studded roll to emboss the outer surface simultaneously with forming the depressions. Materials having a backing fabric uniformly have the depressions formed in the surface opposite from the backing fabric.

BRIEF DESCRIPTION OF THE DRAWINGS

FIG. 1 is a sectional view of processing equipment forming depressions in the outer surface of a fabric backed polyvinyl chloride sheet material. FIG. 2 is an enlarged view of a portion of the material resulting from the process step of FIG. 1 showing the thin section of the polyvinyl chloride film left at the bottom of the depressions.

DETAILED DESCRIPTION

Figure 3:
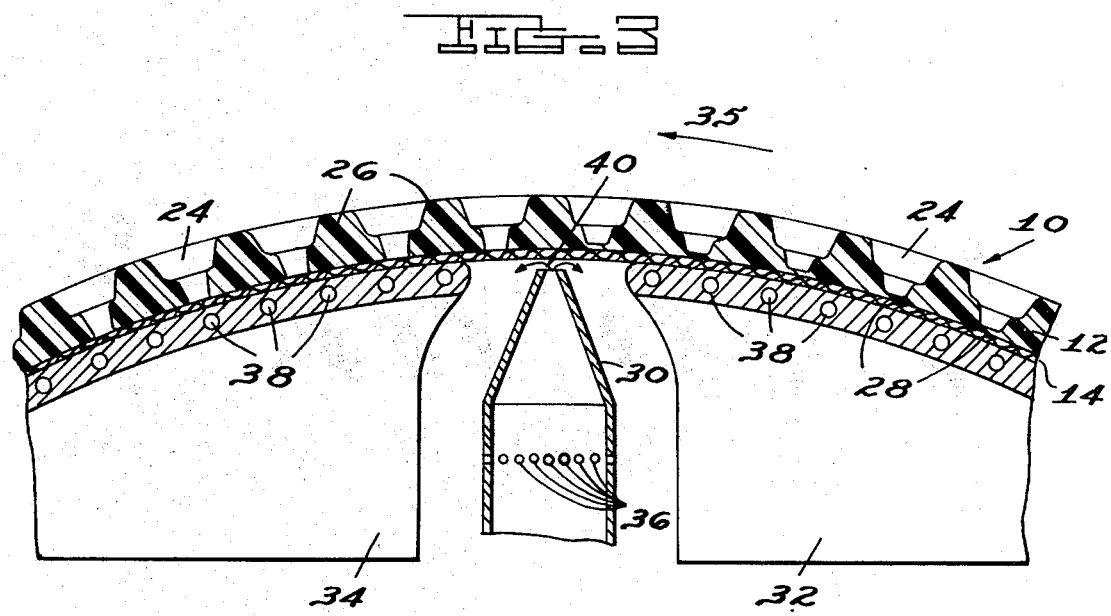
FIG. 3 is a sectional view of equipment directing heated air against the backing side of the sheet material to break through the thin sections and complete the perforations.

Referring to FIG. 1, a sheet material 10 made up of a polyvinyl chloride film 12 adhered to a fabric backing 14 is passing between a metal forming roll 16 and a metal backing roll 18, with the backing fabric 14 in contact with backing roll 18. Forming roll 16 has a plurality of short studs 20 on its exterior surface. Studs 20 can be arranged in any desired pattern, and the portion of roll 16 between the studs contains an embossing pattern of any desired shape indicated by numeral 22.

As sheet material 10 passes between rolls 16 and 18, studs 20 produce a plurlity of depressions 24 in the surface of film 12. Simultaneously, the embossing pattern 22 on roll 16 embosses the surface of film 12 as indicated by numeral 26. As shown in FIG. 2, depressions 24 extend a considerable distance through the thickness of film 12 but leave a thin section 28 of the material of film 12 at the bottom of the depression. This thin section prevents studs 20 from damaging the backing fabric 14.

Turning to FIG. 3, an air nozzle 30 extending the width of the sheet material 10 is located between two cooling shoes 32 and 34. A set of electrical heaters 36 are located within nozzle 30, and a plurality of cooling passages 38 are located near the surfaces of shoes 32 and 34. Shoes 32 and 34 are spaced a considerable distance from nozzle 30 as shown in the figure. Air under pressure is supplied to the bottom of nozzle 30 by any conventional means (not shown).

The sheet material resulting from the processing step of FIG. 1 is directed over shoe 32, nozzle 30, and shoe 34 in the direction of arrow 35 with the backing fabric 14 in contact with or very close to the surfaces of shoes 32 and 34. As the sheet material passes above nozzle 30, air heated to about 400–1000° F. is directed by the nozzle against the back surface of the material. The width of nozzle 30 usually is about 0.020 inch wide. Air temperature and nozzle width vary considerably with the melting point and heat capacity of the sheet material and the rate at which the material moves across the nozzle. Ideal values generally must be determined for each installation. A narrow nozzle width and high air temperature generally provide the most economical operation.

Figure 4:
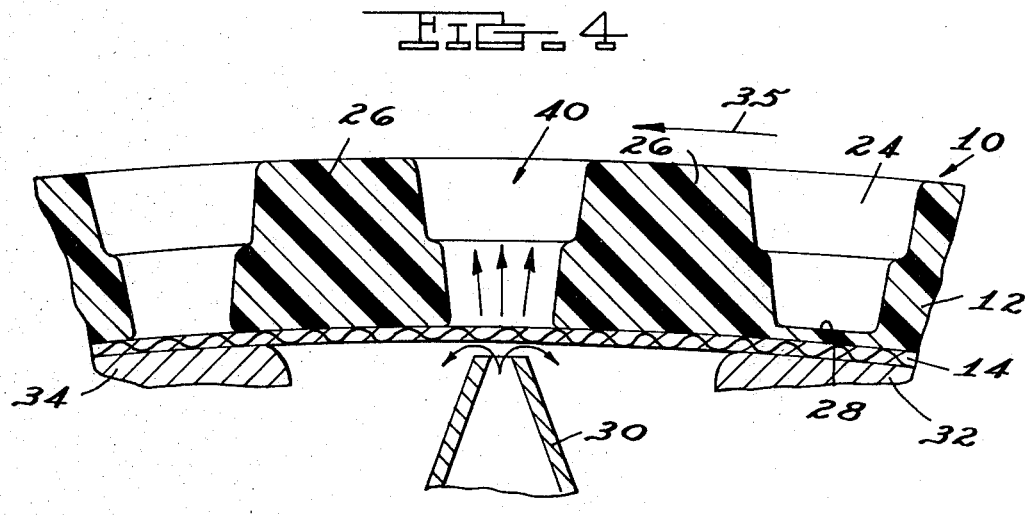
FIG. 4 is an enlarged view of a portion of the material resulting from the processing step of FIG. 3 showing the smooth walls of the completed perforations.

Heat from the air rapidly raises the temperature of thin sections 38 towards the melting point of the material. As the thin sections approach the melting point, the air pressure breaks through the thin sections and some of the heated air indicated by numeral 40 passes through the break and depression 24. Air traveling through the break transfers additional heat to the remaining parts of the thin section to melt the remaining material thereof and blend that material with the material surrounding the depression, and the same air smoothes any high spots and sharp edges of the depression itself. Continued movement of the sheet material brings the perforations above shoe 34 which rapidly cools the sheet material and prevents excessive melting. The resulting perforation has the approximate shape shown in FIG. 4.

Film 12 typically is about 0.030–0.050 inch thick and depressions 24 usually extend through about 80 to 95 percent of the thickness of film 12. The heated air preferably raises the temperature of thin sections 28 to the point where the air pressure will break through the section without significantly heating the embossing 26 or the main body of film 12. Cooling shoe 32 assists in maintaining the main body of film 12 below its melting point.

Thus this invention provides a process for manufacturing a porous sheet of thermoplastic polymeric material having a uniform predictable degree of porosity and good retention of strength properties. The lack of sharp edges and the presence of the melted material from the thin sections inhibit the formation of tears at the perforations. Sheet materials having a backing fabric applied thereto are perforated by the process without damaging the backing fabric.

We claim:

1. A process for manufacturing a porous sheet of thermoplastic polymeric material having a backing fabric attached to one side thereof comprising forming depressions in the other side of the material, said depressions extending through a considerable portion of the material thickness but leaving thin sections of material at the bottoms of the depressions, and applying through the fabric a stream of heated fluid to heat the thin sections and produce a fluid pressure differential across said thin sections and permitting the fluid pressure to break the thin sections without heating excessively the other portions of the polymeric material and without distorting the backing fabric.

2. The process of claim 1 in which the fluid is heated air.

3. The process of claim 2 comprising passing wide sheets of material having said depressions over an elongated nozzle issuing heated air against said thin sections, said heated air raising the temperature of the thin sections to the point where the air breaks through and melts away the thin sections.

4. The process of claim 3 in which the heated air is at least 100 Fahrenheit degrees above the melting temperature of the polymeric material.

5. The process of claim 4 in which the heated air has a temperature at least 300 Fahrenheit degrees above the melting temperature of the polymeric material.

6. The process of claim 5 comprising passing the material over cooling shoes before and after passing the material over the nozzle.

7. The process of claim 1 in which the heated air has a temperature at least 100 Fahrenheit degrees above the melting temperature of the polymeric material.

References Cited

UNITED STATES PATENTS

| | | | |
|---|---|---|---|
| Re. 22,290 | 3/1943 | Teague et al. | 264—156X |
| 2,032,923 | 3/1936 | Eldridge | 264—93 |
| 3,394,211 | 7/1968 | MacDuff | 264—154 |

FOREIGN PATENTS

| | | | |
|---|---|---|---|
| 233,019 | 2/1961 | Australia | 264—93 |
| 851,473 | 10/1960 | Great Britain | 264—93 |

ROBERT F. WHITE, Primary Examiner

J. H. SILBAUGH, Assistant Examiner

U.S. Cl. X.R.

156—209, 220, 253; 264—154, 284, 293, 296